United States Patent
Takahashi et al.

(10) Patent No.: US 8,988,694 B2
(45) Date of Patent: Mar. 24, 2015

(54) IMAGE FORMING APPARATUS, APPLICATION EXECUTING METHOD, AND NON-TRANSITORY COMPUTER-READABLE RECORDING MEDIUM ENCODED WITH APPLICATION EXECUTING PROGRAM

(71) Applicant: Konica Minolta, Inc., Chiyoda-ku (JP)

(72) Inventors: Kenichi Takahashi, Sennan-gun (JP); Kazuaki Tomono, Okazaki (JP); Kazumi Sawayanagi, Itami (JP); Kenji Matsuhara, Kawanishi (JP); Yosuke Taniguchi, Osaka (JP)

(73) Assignee: Konica Minolta, Inc., Chiyoda-Ku, Tokyo (JP)

(*) Notice: Subject to any disclaimer, the term of this patent is extended or adjusted under 35 U.S.C. 154(b) by 0 days.

(21) Appl. No.: 13/938,302

(22) Filed: Jul. 10, 2013

(65) Prior Publication Data
US 2014/0022578 A1    Jan. 23, 2014

(30) Foreign Application Priority Data
Jul. 18, 2012    (JP) .................................. 2012-159433

(51) Int. Cl.
*G06F 15/00* (2006.01)
*G06F 3/12* (2006.01)
*G06F 9/30* (2006.01)
*G06F 9/445* (2006.01)

(52) U.S. Cl.
CPC .......... *G06F 3/1297* (2013.01); *G06F 9/30174* (2013.01); *G06F 8/61* (2013.01)
USPC ....................................... 358/1.13

(58) Field of Classification Search
CPC ................................... G06F 3/1297
USPC ....................................... 358/1.13
See application file for complete search history.

(56) References Cited

U.S. PATENT DOCUMENTS

| | | | |
|---|---|---|---|
| 2005/0046887 A1 | 3/2005 | Shibata et al. | |
| 2006/0164670 A1 | 7/2006 | Morita | |
| 2006/0206296 A1 | 9/2006 | Sato et al. | |
| 2007/0159663 A1 | 7/2007 | Tsujimoto | |
| 2011/0292428 A1* | 12/2011 | Ishii | 358/1.13 |

FOREIGN PATENT DOCUMENTS

| | | |
|---|---|---|
| JP | 2002-84383 A | 3/2002 |
| JP | 2004-54791 A | 2/2004 |
| JP | 2005-80017 A | 3/2005 |
| JP | 2005-80018 A | 3/2005 |
| JP | 2007-174400 A | 7/2007 |
| WO | WO 2005/086449 A1 | 9/2005 |

OTHER PUBLICATIONS

Office Action (Notice of Ground of Rejection) dated Oct. 21, 2014, in corresponding Japanese Patent Application No. 2012-159433, and English translation thereof (9 Pages).

* cited by examiner

*Primary Examiner* — Saeid Ebrahimi Dehkordy
(74) *Attorney, Agent, or Firm* — Buchanan Ingersoll & Rooney PC (57) ABSTRACT

An image forming apparatus includes an operating portion to control hardware resources, an internal control portion to perform a process predetermined for an internal command, an application executing portion to execute an application program and output a simplified command or application command, and an application control portion to convert the simplified command or application command output by the application executing portion into an internal command and output the internal command to the internal control portion. The application control portion includes a simplified command converting portion to convert the simplified command output by the application executing portion into one or more application commands, and output the application command(s) in the order defined for the simplified command, and an application command converting portion to convert the application command output by the application executing portion, or each of the application command(s) sequentially output from the simplified command converting portion, into an internal command.

9 Claims, 8 Drawing Sheets

IMAGE FORMING APPARATUS, APPLICATION EXECUTING METHOD, AND NON-TRANSITORY COMPUTER-READABLE RECORDING MEDIUM ENCODED WITH APPLICATION EXECUTING PROGRAM

This application is based on Japanese Patent Application No. 2012-159433 filed with Japan Patent Office on Jul. 18, 2012, the entire content of which is hereby incorporated by reference.

BACKGROUND OF THE INVENTION

1. Field of the Invention

The present invention relates to an image forming apparatus, an application executing method, and a non-transitory computer-readable recording medium encoded with an application executing program. More particularly, the present invention relates to an image forming apparatus into which an application program can be installed, an application executing method executed by the image forming apparatus, and a non-transitory computer-readable recording medium encoded with an application executing program for causing a computer to execute the application executing method.

2. Description of the Related Art

Some recent image forming apparatuses, typified by multi-function peripherals (MFPs), allow application programs to be installed therein. A user can customize an MFP by installing therein an application program according to the type of usage.

Japanese Patent Laid-Open No. 2002-084383 describes an image forming apparatus which brackets portions common to applications as a common system service, forms a platform using the common system service and a versatile OS, and installs a printer application, a copy application, and other various applications on the platform.

According to this conventional image forming apparatus, the portions common to applications were formed as a common system service on the platform. Thus, for developing a new application, a developer had to understand the common system service and the versatile OS. With such a conventional apparatus, an application developer would have to have a high level of skill to control the hardware resources of the image forming apparatus.

SUMMARY OF THE INVENTION

An aspect of the present invention provides an image forming apparatus which includes: an operating portion to control a hardware resource; an internal control portion operable, in response to an input of an internal command, to perform a process predetermined for the input internal command for causing the operating portion to control the hardware resource; an application executing portion to execute an application program and output a simplified command or application command which has been released for controlling the internal control portion; and an application control portion to convert the simplified command or application command output by the application executing portion into the internal command, and output the obtained internal command to the internal control portion, the application control portion including a simplified command converting portion to convert the simplified command output by the application executing portion into one or more application commands, and output the obtained one or more application commands in the order defined for the simplified command, and an application command converting portion to convert the application command output by the application executing portion, or each of the one or more application commands output in the defined order from the simplified command converting portion, into the internal command.

Another aspect of the present invention provides an application executing method performed in an image forming apparatus, the image forming apparatus including an operating portion to control a hardware resource, an internal control portion operable, in response to an input of an internal command, to perform a process predetermined for the input internal command for causing the operating portion to control the hardware resource, and an application executing portion to execute an application program and output a simplified command or application command which has been released for controlling the internal control portion, wherein the method includes: a simplified command converting step of converting the simplified command output by the application executing portion into one or more application commands, and outputting the obtained one or more application commands in the order defined for the simplified command; an application command converting step of converting the application command output by the application executing portion, or each of the one or more application commands obtained by converting the simplified command in the simplified command converting step and output in the defined order, into the internal command; and an outputting step of outputting the obtained internal command to the internal control portion.

Yet another aspect of the present invention provides a non-transitory computer-readable recording medium encoded with an application executing program performed in a computer controlling an image forming apparatus, the computer including an operating portion to control a hardware resource, an internal control portion operable, in response to an input of an internal command, to perform a process predetermined for the input internal command for causing the operating portion to control the hardware resource, and an application executing portion to execute an application program and output a simplified command or application command which has been released for controlling the internal control portion, wherein the application executing program causes the computer to perform: a simplified command converting step of converting the simplified command output by the application executing portion into one or more application commands, and outputting the obtained one or more application commands in the order defined for the simplified command; an application command converting step of converting the application command output by the application executing portion, or each of the one or more application commands obtained by converting the simplified command in the simplified command converting step and output in the defined order, into the internal command; and an outputting step of outputting the obtained internal command to the internal control portion.

The foregoing and other features, aspects, and advantages of the present invention will become more apparent from the following detailed description of the present invention when taken in conjunction with the accompanying drawings.

DESCRIPTION OF THE PREFERRED EMBODIMENTS

The preferred embodiments of the present invention will be described below in conjunction with the drawings. In the following description, the same or corresponding parts are denoted by the same reference characters. Their names and functions are also the same. Thus, a detailed description thereof will not be repeated.

Figure 1:
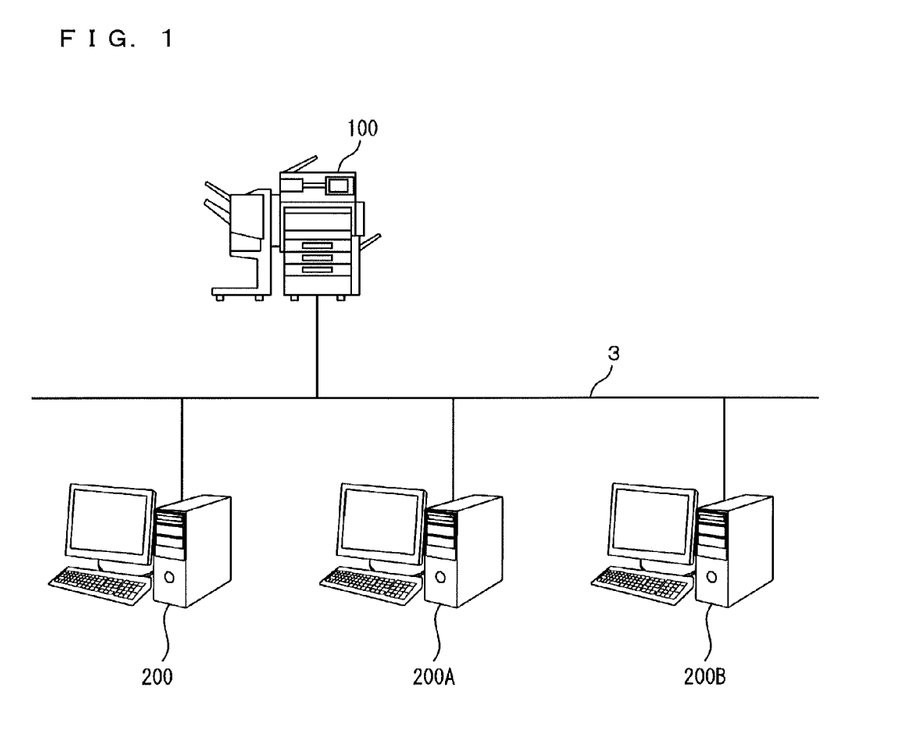
FIG. 1 schematically shows an image forming system according to an embodiment of the present invention.

FIG. 1 schematically shows an image forming system according to an embodiment of the present invention. Referring to FIG. 1, an image forming system 1 includes a multi-function peripheral (hereinafter, referred to as "MFP") 100 and personal computers (hereinafter, referred to as "PCs") 200, 200A, and 200B, which are each connected to a network 3. MFP 100 can communicate with PCs 200, 200A, and 200B via network 3.

While one MFP 100, as an example of an image forming apparatus, is connected to network 3 in FIG. 1, the number of the MFPs is not limited thereto; at least one MFP may be connected to network 3. Further, the image forming apparatus is not limited to the MFP; it may be, e.g., a computer, facsimile machine, printer, or other device, as long as it is provided with the image processing function.

Figure 2:
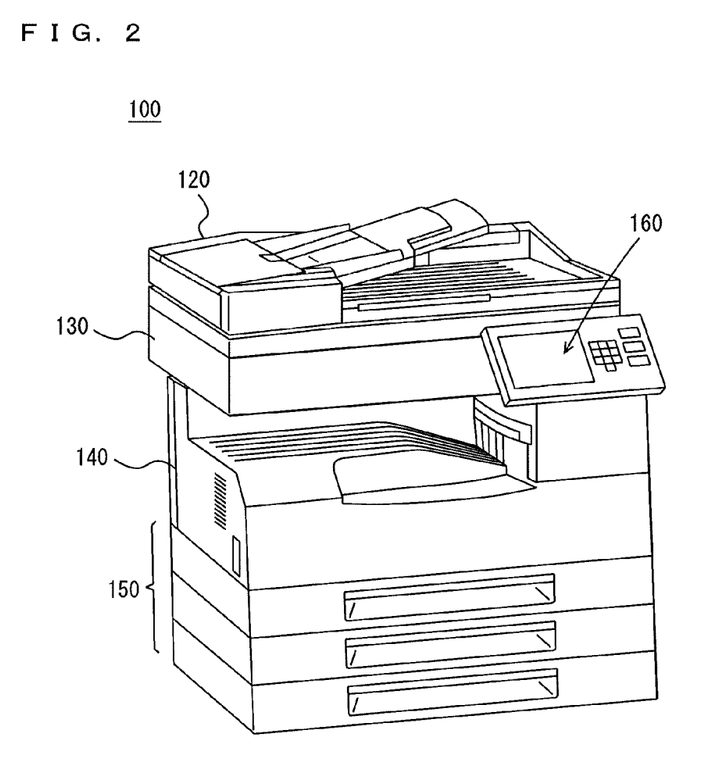
FIG. 2 is a perspective view showing an example of the appearance of an MFP.
Figure 3:
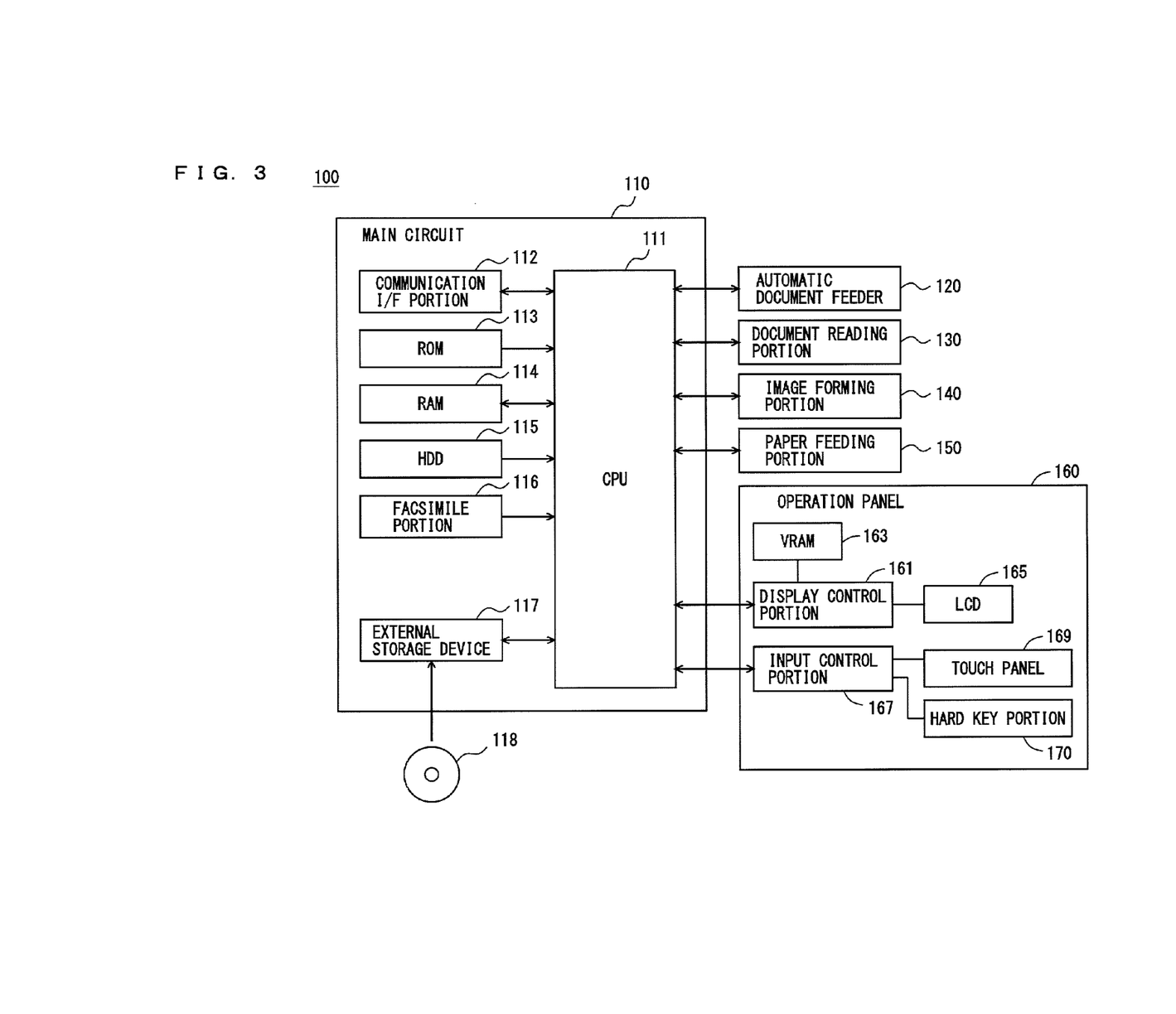
FIG. 3 is a block diagram showing an example of the hardware configuration of the MFP.

FIG. 2 is a perspective view showing an example of the appearance of the MFP. FIG. 3 is a block diagram showing an example of the hardware configuration of the MFP. Referring to FIGS. 2 and 3, MFP 100 serving as the image forming apparatus includes: a main circuit 110; a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing, such as shading compensation, on image data received from document reading portion 130 and, on the basis of the processed image data, or on the basis of externally received image data, forms an image on a sheet of paper fed by paper feeding portion 150.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the same to image forming portion 140, thereby causing image forming portion 140 to form an image on a sheet of paper on the basis of the facsimile data received by facsimile portion 116. Further, facsimile portion 116 converts the data stored in HDD 115 to facsimile data, and transmits the same to a facsimile machine connected to the PSTN.

Communication I/F portion 112 is an interface for connecting MFP 100 to network 3. Communication I/F portion 112 communicates with another computer or image forming apparatus connected to network 3, using a communication protocol such as the transmission control protocol (TCP) or the file transfer protocol (FTP). Network 3 to which communication I/F portion 112 is connected is a local area network (LAN). It may be connected in a wired or wireless manner. Network 3 is not necessarily the LAN; it may be a wide area network (WAN), public switched telephone networks (PSTN), the Internet, or the like.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Operation panel 160 includes: a liquid crystal display (LCD) 165; a display control portion 161 which controls display on LCD 165; a video RAM (VRAM) 163; a touch panel 169; a hard key portion 170; and an input control portion 167 which controls touch panel 169 and hard key portion 170. LCD 165 and hard key portion 170 are arranged on an upper surface of MFP 100.

Display control portion 161 is connected to CPU 111, VRAM 163, and LCD 165. VRAM 163 is used as a work area of display control portion 161, and temporarily stores an image to be displayed on LCD 165. Display control portion 161, under the control of CPU 111, controls LCD 165 to cause LCD 165 to display the image stored in VRAM 163. Display control portion 161 causes LCD 165 to display an operation screen, which will be described later.

Hard key portion 170 includes a plurality of hard keys. The hard keys, which are contact switches, are connected to input control portion 167. Each hard key, when depressed by an operation user, closes its contact to close a circuit connected to input control portion 167. Each hard key closes the circuit while being depressed by an operation user who operates MFP 100, whereas it opens the circuit while not being depressed by the operation user.

Touch panel 169 is disposed on an upper or lower surface of LCD 165, and outputs the coordinates of a position pushed by the operation user to input control portion 167. Touch panel 169 detects the position designated by the operation user with his/her finger or a stylus pen, and outputs the coordinates of the detected position to input control portion 167. Touch panel 169 preferably has a size equal to or greater than that of the display surface of LCD 165. As touch panel 169 is disposed on the surface of LCD 165, when the operation user designates a position on the display surface of LCD 165, touch panel 169 outputs the coordinates of the position that the operation user has designated on the display surface of LCD 165, to input control portion 167. The touch panel may be, for example, of a resistive type, a surface acoustic wave type, an infrared ray type, an electromagnetic induction type, or a capacitance type, although it is not limited to these types.

If there is any hard key that closed the circuit in hard key portion 170, input control portion 167 outputs identification information for identifying the hard key that closed the circuit, to CPU 111. When touch panel 169 detects a position designated by the operation user, input control portion 167 outputs the coordinates that are output from touch panel 169, as position information indicating the position on the display surface of LCD 165, to CPU 111.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 mounted on external storage device 117, into RAM 114 for execution. It is noted that the program executed by CPU 111 is not restricted to the program recorded on CD-ROM 118. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

PCs 200, 200A, and 200B are typical computers. Their hardware configurations and functions are well known, and thus, a description thereof will not be included here.

Figure 4:
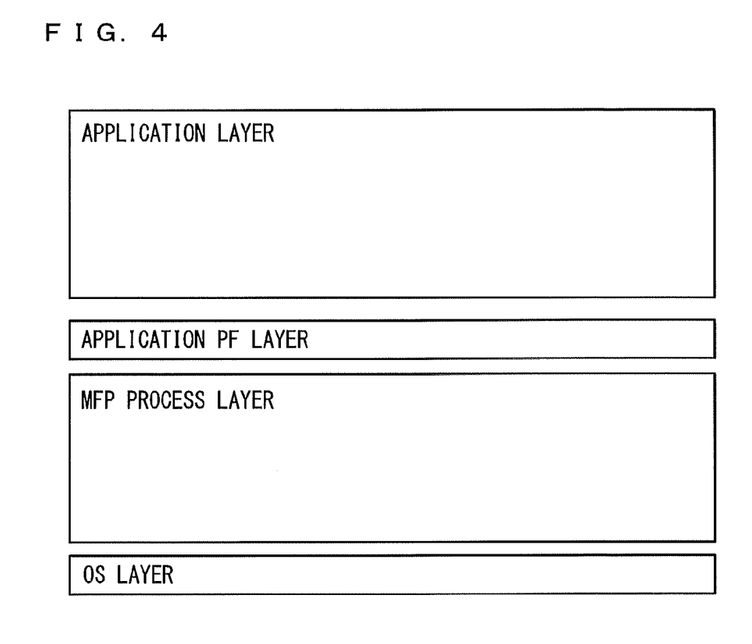
FIG. 4 shows an example of the software architecture of a CPU included in the MFP.

FIG. 4 shows an example of the software architecture of the CPU included in the MFP. Referring to FIG. 4, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs a process of controlling hardware resources in MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, display control portion 161, and input control portion 167. The task belonging to the OS layer controls the hardware resources in accordance with an operating command input from the MFP process layer.

A task for CPU 111 to execute an application program belongs to the application layer. In the case where two or more application programs are installed into MFP 100, two or more tasks for executing the respective application programs may belong to the application layer. The application programs include programs for customizing a user interface and the like so as to cause MFP 100 to perform the copying process, scanning process, printing process, facsimile transmitting/receiving process, data transmitting/receiving process, and so on. It is noted that the application programs are not restricted to the above-described programs; there may be another application program. An application program is described, for example, in a programming language such as Python, although the language is not limited thereto.

The task for executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task for executing the application program outputs a simplified command or an application command. The simplified command and application command are commands which have been released as an application program interface (API). This facilitates creation of an application program for causing MFP 100 to perform a process. Releasing something means that a third party other than the manufacturer of MFP 100 can use it. The third party is able to use the simplified commands and application commands to develop an application program.

A simplified command includes one or more application commands, whereas an application command does not include a simplified command. In other words, a simplified command defines one or more application commands and the order of execution of those application commands, for causing MFP 100 to perform a predetermined series of processes.

For example, in the case of describing a segment, in an application program, for performing a process of changing a setting value in MFP 100, it is necessary to describe the following first through sixth application commands in this order: a first application command (to display panel part), which is a command to display a button to which an instruction to display a screen for changing a setting value is assigned; a second application command (to determine depression of panel button), which is a command to detect that an operation of designating the button has been input into operation panel 160; a third application command (to acquire condition), which is a command to acquire a current setting value; a fourth application command (to generate and change screen), which is a command to generate and display a screen for displaying the read setting value; a fifth application command (to determine an input), which is a command to accept a setting value input into operation panel 160; and a sixth application command (to reflect the input data), which is a command to update the current setting value with the accepted setting value. The simplified command is a command that describes the first through sixth commands, mentioned above, in the segment for performing the process of changing a setting value in MFP 100. This makes it possible, in the development phase of an application program, to use one simplified command, in place of the first through sixth application commands, for describing the segment for performing the process of changing a setting value in MFP 100.

The application PF layer, located between the application layer and the MFP process layer, has belonging thereto a task for arbitrating a plurality of tasks belonging to the application layer and also controlling the simplified commands and application commands output from the plurality of tasks belonging to the application layer. Specifically, the application PF layer brings one of the tasks belonging to the application layer into a currently selected state in which data can be input/output. The application PF layer accepts the simplified commands and application commands output from the tasks belonging to the application layer, converts the simplified commands and application commands into internal commands, and outputs the internal commands to the MFP process layer.

Application commands are associated with internal commands in advance. For example, a commands correspondence table may be stored. One application command may correspond to one internal command, or one application command may correspond to a set of two or more internal commands. Further, a plurality of application commands of different versions may correspond to one internal command or to a set of two or more internal commands. This can address the case where a plurality of application programs are of different versions. The internal command is a command which has not been released and which depends upon the hardware resource(s) in MFP 100.

The MFP process layer is located between the application PF layer and the OS layer. The MFP process layer has belonging thereto a task for converting an internal command output from a task belonging to the application PF layer, into an operating command which can be interpreted by a task belonging to the OS layer, and outputting the operating command to the task belonging to the OS layer. While an internal command may be actually converted into one or more operating commands which can be executed by a task belonging to the OS layer, for the sake of description, it is here assumed that one internal command is converted into one operating command executable by the task belonging to the OS layer.

The application PF layer converts an application command into an internal command. Therefore, while the application PF layer depends upon the application layer, it does not depend upon the hardware resources. This enables a same application PF layer to be used in a plurality of MFPs having different hardware resources. On the other hand, while the MFP process layer depends upon the hardware resources, it does not depend upon the application layer. This enables a same MFP process layer to be used in different MFPs having the same hardware resources.

Figure 5:
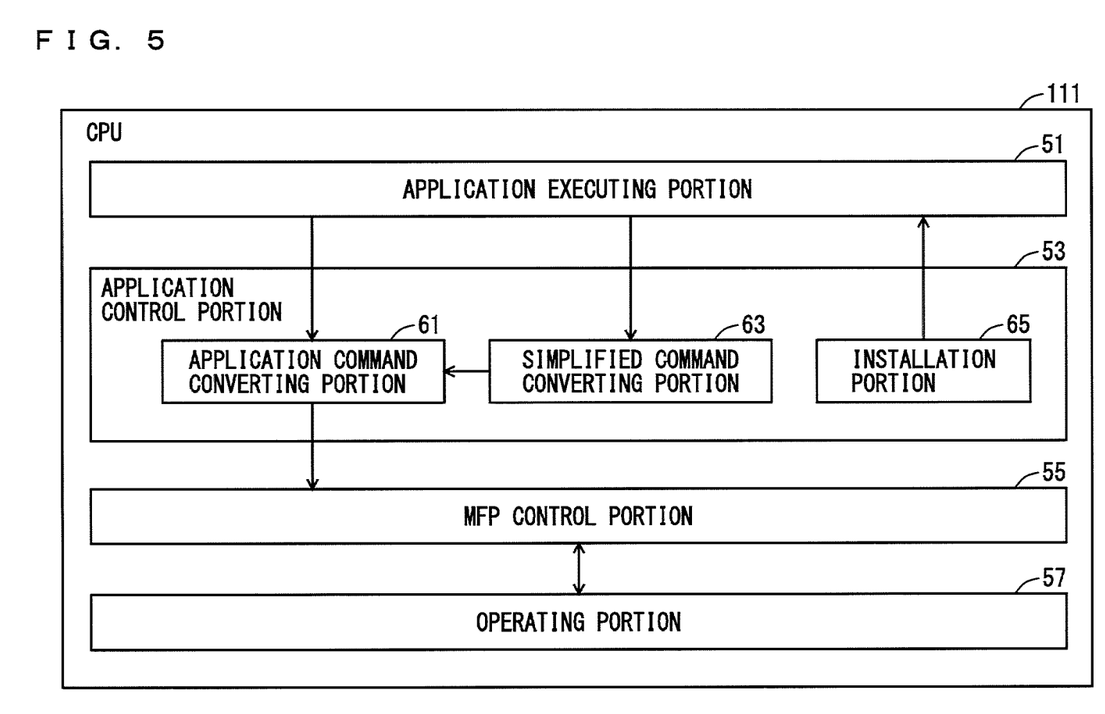
FIG. 5 is a block diagram showing, by way of example, the functions of the CPU included in the MFP according to an embodiment of the present invention.

FIG. 5 is a block diagram showing, by way of example, the functions of the CPU included in the MFP according to an embodiment of the present invention. The functions shown in FIG. 5 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP control program, an application control program, and an application program.

Referring to FIG. 5, CPU 111 includes an application executing portion 51, an application control portion 53, an MFP control portion 55, and an operating portion 57. Application executing portion 51 belongs to the application layer in the software architecture shown in FIG. 4. Application executing portion 51 is a function implemented by a task for CPU 111 to execute an application program. Application executing portion 51 outputs a simplified command or application command, which has been determined by an application program, to application control portion 53. Application executing portion 51 is able to execute a plurality of application programs. In this case, application executing portion 51 forms a plurality of tasks corresponding respectively to a plurality of application programs by executing the application programs. The task formed by executing an application program outputs a simplified command or application command to application control portion 53.

Application control portion 53 is a function implemented by a task for CPU 111 to execute the application control program. Application control portion 53 belongs to the application PF layer in the software architecture shown in FIG. 4.

Application control portion 53 includes an application command converting portion 61, a simplified command converting portion 63, and an installation portion 65. Installation portion 65 installs an application program into MFP 100 in accordance with an installation instruction input by a user. An installation instruction may be received from one of PCs 200, 200A, and 200B by communication I/F portion 112, or may be input into operation panel 160. When a user operates operation panel 160 to input an installation instruction, installation portion 65 accepts the installation instruction from input control portion 167. When a user operates one of PCs 200, 200A, and 200B to remotely control MFP 100 to input an installation instruction, installation portion 65 accepts the installation instruction that communication I/F portion 112 receives from the one of PCs 200, 200A, and 200B.

Installation portion 65 acquires the application program designated by the user. In the case where a user who wishes to cause MFP 100 to read an application program mounts CD-ROM 118 storing the application program on external storage device 117, installation portion 65 reads and acquires the application program stored in CD-ROM 118 via external storage device 117. In the case where a user inputs into MFP 100 an instruction to download an application program stored in a computer connected to network 3, installation portion 65 downloads and acquires the application program via communication I/F portion 112. Installation portion 65 stores the acquired application program into HDD 115. Application executing portion 51 described above reads the application program stored in HDD 115 by installation portion 65, into RAM 114 for execution.

Simplified command converting portion 63 receives a simplified command output from the task formed in application executing portion 51, converts the simplified command into one or more application commands in accordance with a command conversion table, and outputs the obtained one or more application commands to application command converting portion 61, in the order that is defined for the simplified command in the command conversion table.

The command conversion table defines, for a simplified command, one or more application commands and the order of execution of those application commands. When there are two or more simplified commands, the command conversion table defines, for each of the plurality of simplified commands, one or more application commands and the order of execution of those application commands. Therefore, in the case where a new simplified command appears, the command conversion table is updated with a new command table which defines, for the new simplified command, one or more application commands and the order of execution thereof. This enables installation of an application program having the new simplified command described therein.

Application command converting portion 61 receives an application command output from the task formed in application executing portion 51, or an application command output from simplified command converting portion 63. Application command converting portion 61 converts the application command into an internal command in accordance with a commands correspondence table. Application command converting portion 61 outputs the obtained internal command to MFP control portion 55.

The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This makes it possible, with a simple operation of updating the commands correspondence table, to install an application program having the new application command described therein.

In the case where application executing portion 51 is formed with a plurality of tasks for executing application programs, application control portion 53 arbitrates the plurality of tasks. Specifically, in the case where application executing portion 51 is formed by a plurality of tasks for executing application programs, application control portion 53 brings one of the tasks into a currently selected state in which data can be input/output. Hereinafter, one of the plurality of tasks, formed in application executing portion 51, that has been brought into the currently selected state by application control portion 53 will be referred to as "current task".

Simplified command converting portion 63 receives a simplified command output from a current task. Application command converting portion 61 receives an application command output from a current task, or receives one or more application commands that simplified command converting portion 63 has obtained by converting the simplified command output from the current task.

MFP control portion 55 is a function implemented by a task for CPU 111 to execute the MFP control program. MFP control portion 55 belongs to the MFP process layer in the software architecture shown in FIG. 4. MFP control portion 55 receives an internal command from application command converting portion 61 in application control portion 53, and executes processing determined by the internal command.

The processing determined by an internal command includes processing for controlling a hardware resource included in MFP 100, and data processing. The hardware resources included in MFP 100 include HDD 115, facsimile portion 116, communication I/F portion 112, external storage device 117, automatic document feeder 120, document reading portion 130, image forming portion 140, and paper feeding portion 150. The data processing is not particularly limited, but may be sharpening, synthesis, enlargement, reduction, or other processing performed on image data.

In the case of executing processing for controlling a hardware resource included in MFP 100, MFP control portion 55 converts the internal command into an operating command, and outputs the operating command to operating portion 57. The relationship between an internal command and an operating command is determined in advance between MFP control portion 55 and operating portion 57.

Operating portion 57 is a function implemented by a task for CPU 111 to execute the OS program. An operating command is a command which can be interpreted by operating portion 57. Operating portion 57 controls hardware resources of MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, display control portion 161, and input control portion 167. Operating portion 57 controls the hardware resources in accordance with an operating command input from MFP control portion 55.

A specific example of the simplified command will now be described. Here, a simplified command for changing the resolution of an image to be displayed on LCD 165 included in operation panel 160 of MFP 100 will be described as an example. In the case of using only application commands, without using a simplified command, to describe the processing for changing the resolution of an image to be displayed on LCD 165 included in operation panel 160 of MFP 100, the following first through sixth application commands have to be described in this order: a first application command (to display panel part), which is a command to display a button to which an instruction to display a screen for changing a resolution setting value is assigned; a second application command (to determine depression of panel button), which is a command to detect that an operation of designating the button has been input into operation panel 160; a third application command (to acquire condition), which is a command to acquire a current resolution setting value; a fourth application command (to generate and change screen), which is a command to generate and display a screen for displaying the read setting value; a fifth application command (to determine an input), which is a command to accept a setting value input into operation panel 160; and a sixth application command (to reflect the input data), which is a command to update the current resolution setting value with the accepted setting value. A simplified command for changing the resolution of an image to be displayed on LCD 165 included in operation panel 160 of MFP 100 defines the first through sixth commands, mentioned above, and the order of execution of those application commands.

Figure 6:
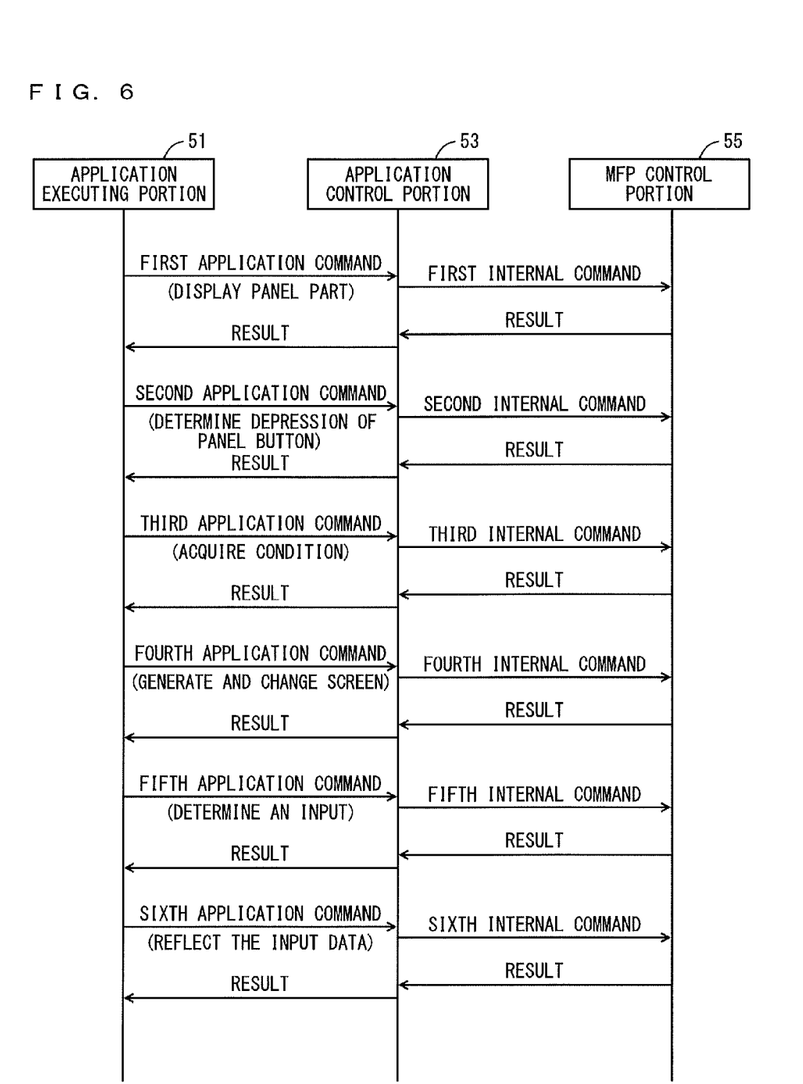
FIG. 6 shows a relationship between application commands and internal commands in a process for changing a resolution.

FIG. 6 shows a relationship between application commands and internal commands in a process for changing a resolution. Referring to FIG. 6, application executing portion 51 executes an application program and outputs the first through sixth application commands, described in the application program, to application control portion 53. At this time, application executing portion 51 outputs the first through sixth application commands in this order, as defined by the application program. For example, application executing portion 51 first outputs the first application command to application control portion 53 and, when it receives a result corresponding to the first application command from application control portion 53, application executing portion 51 outputs a next command, i.e. the second application command, to application control portion 53.

As application control portion 53 receives the first through sixth application commands from application executing portion 51 in this order, application control portion 53 converts them into first through sixth internal commands, respectively, and outputs the first through sixth internal commands to MFP control portion 55. For example, when application control portion 53 receives the first application command, application control portion 53 converts the first application command into a first internal command, and outputs the first internal command to MFP control portion 55. When MFP control portion 55 receives the first internal command, MFP control portion 55 performs a process corresponding to the first internal command, and outputs a result of execution to application control portion 53. After application control portion 53 output the first internal command, when it receives a result corresponding to the first internal command from MFP control portion 55, application control portion 53 outputs the received result, as the result corresponding to the first application command, to application executing portion 51. In other words, the timings for application control portion 53 to output the first through sixth internal commands to MFP control portion 55 depend upon the timings for application executing portion 51 to output the first through sixth application commands. That is, application executing portion 51 controls the timings at which the first through sixth internal commands are input to MFP control portion 55.

Figure 7:
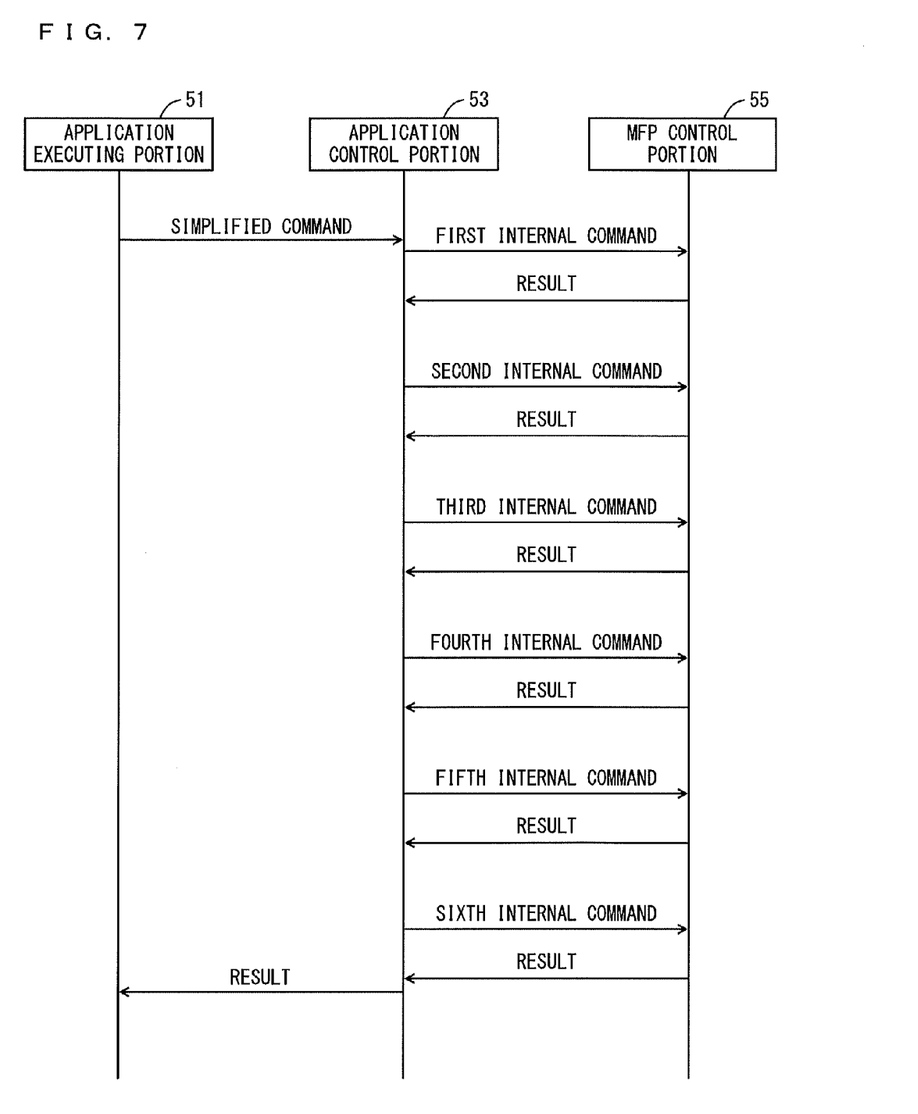
FIG. 7 shows a relationship between a simplified command, which defines a process for changing a resolution, and internal commands.

FIG. 7 shows a relationship between a simplified command, which defines a process for changing a resolution, and internal commands. Referring to FIG. 7, application executing portion 51 executes an application program and outputs the simplified command, which is described in the application program and which defines the process for changing a resolution, to application control portion 53.

When application control portion 53 receives the simplified command defining the process for changing a resolution from application executing portion 51, application control portion 53 converts the simplified command into first through sixth internal commands, and outputs the first through sixth internal commands to MFP control portion 55. For example, when application control portion 53 receives the simplified command defining the process for changing a resolution, application control portion 53 converts the simplified command into first through sixth internal commands, and outputs the first through sixth internal commands, in this order, to MFP control portion 55. When MFP control portion 55 receives the first internal command, MFP control portion 55 performs a process corresponding to the first internal command, and outputs the result to application control portion 53. After application control portion 53 output the first internal command, when it receives the result corresponding to the first internal command from MFP control portion 55, application control portion 53 outputs a next command in the order of execution, i.e. the second internal command, to MFP control portion 55. In other words, the timings for application control portion 53 to output the first through sixth internal commands to MFP control portion 55 are determined by application control portion 53.

Figure 8:
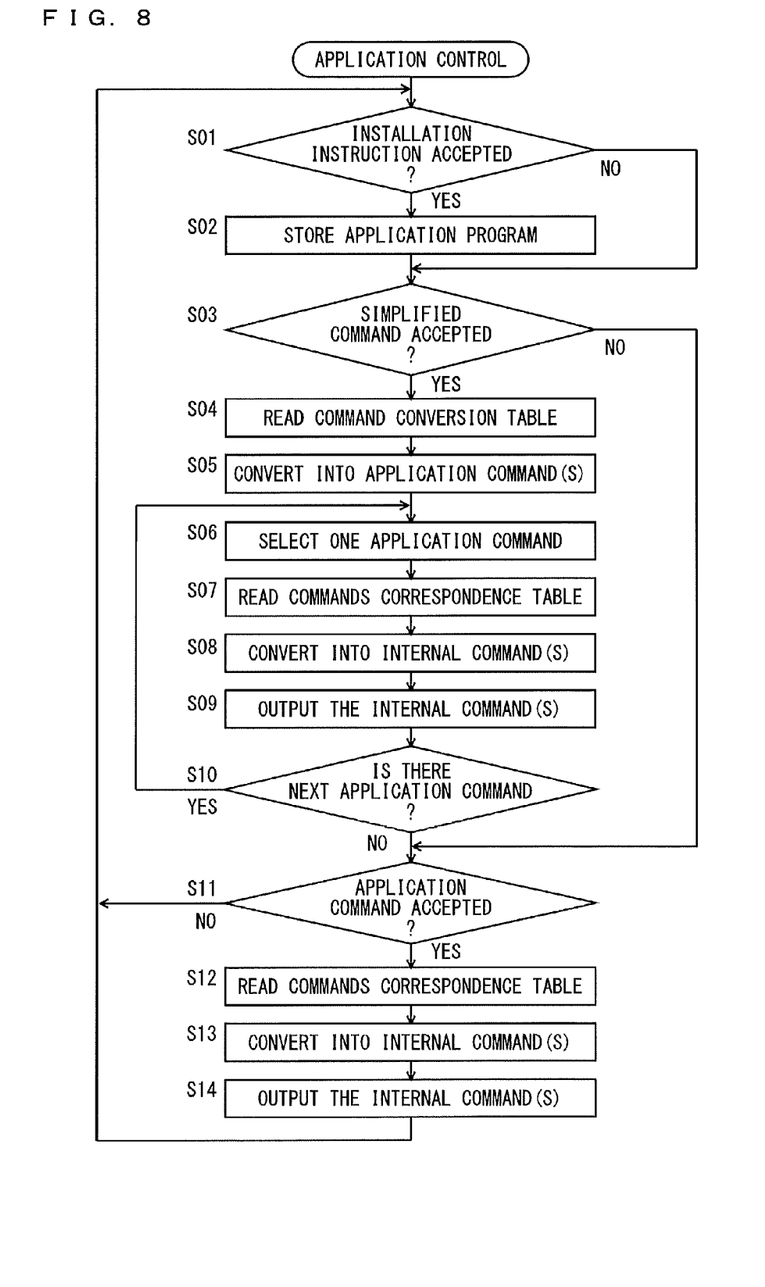
FIG. 8 is a flowchart illustrating an example of the flow of an application control process according to the embodiment of the present invention.

FIG. 8 is a flowchart illustrating an example of the flow of an application control process according to the embodiment of the present invention. The application control process is carried out by CPU 111 included in MFP 100 as CPU 111 executes the application control program stored in ROM 113, HDD 115, or CD-ROM 118. Referring to FIG. 8, CPU 111 determines whether an installation instruction has been accepted (step S01). If an installation instruction has been accepted ("YES" in step S01), the process proceeds to step S02; otherwise ("NO" in step S01), the process proceeds to step S03.

In step S02, CPU 111 stores into HDD 115 an application program which is input from the outside along with the installation instruction, and the process proceeds to step S03. In the case where communication I/F portion 112 receives the installation instruction from one of PCs 200, 200A, and 200B in step S01, CPU 111 stores in HDD 115 the application program that communication I/F portion 112 receives from that PC. In the case where input control portion 167 accepts the installation instruction in step S01, CPU 111 stores in HDD 115 the application program that external storage device 117 reads from CD-ROM 118. Alternatively, CPU 111 may download an application program from a server connected to the Internet.

In the following step S03, CPU 111 determines whether a simplified command has been accepted. In the case where a simplified command is input from a task for executing the application program (i.e. application executing portion 51), CPU 111 accepts the simplified command. If a simplified command is accepted, the process proceeds to step S04; otherwise, the process proceeds to step S11.

In step S04, CPU 111 reads a command conversion table stored in HDD 115. The command conversion table defines, for a simplified command, one or more application commands and the order of execution of those application commands. CPU 111 refers to the command conversion table to convert the simplified command, accepted in step S03, into one or more application commands (step S05). In the following step S06, CPU 111 selects one of the obtained application commands, in accordance with the order of execution defined in the command conversion table. Specifically, CPU 111 selects an application command that is earlier in the order of execution.

In the following step S07, CPU 111 reads a commands correspondence table stored in HDD 115. The commands correspondence table associates one application command with one or more internal commands. CPU 111 refers to the commands correspondence table to convert the application command, selected in step S06, into one or more internal commands (step S08). In the following step S09, CPU 111 outputs the obtained internal command(s) to a task for executing the MFP control program (i.e. MFP control portion 55). The process then proceeds to step S10.

In step S10, CPU 111 determines whether there is an application command yet to be selected from among the one or more application commands obtained by converting the simplified command in step S05. If there is an application command yet to be selected, the process returns to step S06; otherwise, the process proceeds to step S11.

In step S11, CPU 111 determines whether an application command has been accepted. In the case where an application command is input from the task for executing the application program (application executing portion 51), the application command is accepted. If an application command has been accepted, the process proceeds to step S12; otherwise, the process returns to step S01.

In step S12, CPU 111 reads a commands correspondence table stored in HDD 115. The commands correspondence table associates one application command with one or more internal commands. CPU 111 refers to the commands correspondence table to convert the application command, accepted in step S11, into one or more internal commands (step S13). In the following step S14, CPU 111 outputs the internal command(s) to the task for executing the MFP control program (MFP control portion 55). The process then returns to step S01.

As described above, in MFP 100 according to the present embodiment, CPU 111 includes: operating portion 57 which executes an operating program for controlling a hardware resource; MFP control portion 55 which, in response to an input of an internal command, performs a process predetermined for the internal command for causing operating portion 57 to control the hardware resource; application executing portion 51 which executes an application program and outputs a simplified command or application command which has been released for controlling MFP control portion 55; and application control portion 53 which converts the simplified command or application command output by application executing portion 51, into an internal command, and outputs the obtained internal command to MFP control portion 55.

Application commands are associated with internal commands in advance in a commands correspondence table. A plurality of application commands of different versions can be associated with one internal command or a set of two or more internal commands. This can address, for example, the case where a plurality of application programs are of different versions. Specifically, when a new application command appears, the commands correspondence table can be updated with a commands correspondence table in which the new application command is associated with one or more internal commands. This enables installation of an application program having the new application command described therein.

Further, application control portion 53 is disposed between application executing portion 51 and MFP control portion 55, and the commands correspondence table is stored. Application control portion 53 converts an application command into one or more internal commands. Therefore, although application control portion 53 depends upon the application commands, it does not depend upon the hardware resources, so that a same application control portion can be used in a plurality of MFPs having different hardware resources. This facilitates the development of an application control program. More specifically, in each of the MFPs having different hardware resources, the commands correspondence table which corresponds to the hardware resources included in the relevant MFP can be stored, to allow the MFPs to execute the same application control program. This makes it easy to develop an application control program.

Further, although MFP control portion 55 depends upon the hardware resources, it does not depend upon the application commands, so that a same MFP control portion can be used in a plurality of MFPs having identical hardware resources. This facilitates the development of an MFP control program.

Furthermore, application control portion 53 includes: simplified command converting portion 63 which converts a simplified command output by application executing portion 51 into at least one application command; and application command converting portion 61 which converts an application command output by application executing portion 51, or at least one application command obtained by simplified command converting portion 63 by converting the simplified command, into an internal command. When an application command is output by application executing portion 51 which executes an application program, the application command is converted into an internal command. When a simplified command is output by application executing portion 51 which executes the application program, the simplified command is converted into one or more application commands, and the one or more application commands obtained by converting the simplified command are each converted into one or more internal commands. MFP control portion 55 performs a process predetermined for the internal command, to control the hardware resource. Irrespective of whether application executing portion 51 which executes an application program outputs a simplified command or an application command, it is possible to cause MFP control portion 55 to perform a process. Therefore, an application program can be described using a simplified command, instead of application commands. This makes it easy to develop an application program for controlling the hardware resources.

While MFP 100 has been described as an example of an image forming apparatus in the above embodiment, the present invention may of course be understood as an application executing method for causing MFP 100 to execute the processing shown in FIG. 8, or as an application executing program for causing CPU 111 to execute the application executing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
    an operating portion to control a hardware resource;
    an internal control portion operable, in response to an input of an internal command, to perform a process predetermined for said input of said internal command for causing said operating portion to control said hardware resource;
    an application executing portion to execute an application program and output a simplified command or an application command which has been released for controlling said internal control portion; and
    an application control portion to convert the simplified command or application command output by said application executing portion into said internal command, and output said obtained internal command to said internal control portion, said application control portion including
        a simplified command converting portion to convert said simplified command output by said application executing portion into a plurality of application commands, and output the obtained said plurality of application commands in the order defined for said simplified command, and
        an application command converting portion to convert said application command output by said application executing portion, or each of said plurality of application commands output in the defined order from said simplified command converting portion, into said internal command.

2. The image forming apparatus according to claim 1, further comprising an installation portion to install an application program, wherein
    said application executing portion executes said installed application program.

3. The image forming apparatus according to claim 2, wherein in the case where said installation portion installs a plurality of application programs, said application executing portion executes at least one of said plurality of application programs.

4. An application executing method performed in an image forming apparatus,
    said image forming apparatus including
        an operating portion to control a hardware resource,
        an internal control portion operable, in response to an input of an internal command, to perform a process predetermined for said input of said internal command for causing said operating portion to control said hardware resource, and
        an application executing portion to execute an application program and output a simplified command or an application command which has been released for controlling said internal control portion,
    the method comprising:
        a simplified command converting step of converting said simplified command output by said application executing portion into a plurality of said application commands, and outputting the obtained said plurality of application commands in the order defined for said simplified command;
   an application command converting step of converting said application command output by said application executing portion, or each of said plurality of application commands obtained by converting said simplified command in said simplified command converting step and output in the defined order, into said internal command; and
   an outputting step of outputting said obtained internal command to said internal control portion.

5. The application executing method according to claim 4, further comprising an installing step of installing an application program, wherein
   said application executing step includes a step of executing said installed application program.

6. The application executing method according to claim 5, wherein
   said application executing step includes a step of, in the case where said installation portion installs a plurality of application programs, executing at least one of said plurality of application programs.

7. A non-transitory computer-readable recording medium encoded with an application executing program performed in a computer controlling an image forming apparatus,
   said computer including
      an operating portion to control a hardware resource,
      an internal control portion operable, in response to an input of an internal command, to perform a process predetermined for said input of said internal command for causing said operating portion to control said hardware resource, and
      an application executing portion to execute an application program and output a simplified command or an application command which has been released for controlling said internal control portion,
   the application executing program causing said computer to perform:
      a simplified command converting step of converting said simplified command output by said application executing portion into a plurality of said application commands, and outputting the obtained said plurality of application commands in the order defined for said simplified command;
      an application command converting step of converting said application command output by said application executing portion, or each of said plurality of application commands obtained by converting said simplified command in said simplified command converting step and output in the defined order, into said internal command; and
      an outputting step of outputting said obtained internal command to said internal control portion.

8. The application executing program according to claim 7, further causing said computer to perform a step of installing an application program, wherein
   said application executing step includes a step of executing said installed application program.

9. The application executing program according to claim 8, wherein
   said application executing step includes a step of, in the case where said installation portion installs a plurality of application programs, executing at least one of said plurality of application programs.

* * * * *